United States Patent
Erhard et al.

(10) Patent No.: US 12,463,447 B2
(45) Date of Patent: Nov. 4, 2025

(54) SYSTEM AND METHOD FOR DETERMINING CHARGING PROFILES

(71) Applicant: Bayerische Motoren Werke Aktiengesellschaft, Munich (DE)

(72) Inventors: Simon Erhard, Geltendorf (DE); Andreas Ertlmeier, Wolnzach (DE); Juergen Hildinger, Hoehenkirchen-Siegertsbrunn (DE); Dennis Kunz, Munich (DE); Hajo Meinert, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 525 days.

(21) Appl. No.: 17/435,260

(22) PCT Filed: Mar. 26, 2020

(86) PCT No.: PCT/EP2020/058539
§ 371 (c)(1),
(2) Date: Aug. 31, 2021

(87) PCT Pub. No.: WO2020/201008
PCT Pub. Date: Oct. 8, 2020

(65) Prior Publication Data
US 2022/0131402 A1    Apr. 28, 2022

(30) Foreign Application Priority Data
Apr. 2, 2019 (DE) .................. 10 2019 108 607.8

(51) Int. Cl.
*H02J 7/00* (2006.01)
*B60L 53/62* (2019.01)
*B60L 58/12* (2019.01)

(52) U.S. Cl.
CPC ........ *H02J 7/007194* (2020.01); *B60L 53/62* (2019.02); *B60L 58/12* (2019.02); *H02J 7/0048* (2020.01); *H02J 7/00712* (2020.01)

(58) Field of Classification Search
USPC .................................................. 320/150–154
See application file for complete search history.

(56) References Cited

U.S. PATENT DOCUMENTS

| | | | |
|---|---|---|---|
| 2011/0291621 A1* | 12/2011 | Iles ..................... | H01M 10/443 320/152 |
| 2013/0307466 A1* | 11/2013 | Frisch .................... | H02J 3/322 320/106 |

(Continued)

FOREIGN PATENT DOCUMENTS

| | | |
|---|---|---|
| CN | 102044723 A | 5/2011 |
| CN | 103412264 A | 11/2013 |

(Continued)

OTHER PUBLICATIONS

International Search Report (PCT/ISA/210) issued in PCT Application No. PCT/EP2020/058539 dated Jun. 29, 2020 with English translation (five (5) pages).

(Continued)

*Primary Examiner* — Samuel Berhanu
(74) *Attorney, Agent, or Firm* — Crowell & Moring LLP

(57) ABSTRACT

A method for determining a charging profile from a large number of charging profiles for a current charging process for charging an electrical energy store includes determining a current state of the energy store, determining the charging profile from the large number of charging profiles based on the current state of the energy store, and charging the energy store based on the determined charging profile.

14 Claims, 3 Drawing Sheets

(56) References Cited

U.S. PATENT DOCUMENTS

| | | | |
|---|---|---|---|
| 2014/0266068 A1 | 9/2014 | O'Brien et al. | |
| 2015/0069969 A1* | 3/2015 | Wu | H02J 50/10 |
| | | | 320/109 |
| 2018/0145531 A1* | 5/2018 | Jung | H02J 7/005 |
| 2018/0345800 A1* | 12/2018 | Beer | B60L 53/18 |

FOREIGN PATENT DOCUMENTS

| | | | |
|---|---|---|---|
| CN | 105207302 A | 12/2015 | |
| CN | 105904985 A | 8/2016 | |
| DE | 10 2011 008 676 A1 | 7/2012 | |
| DE | 10 2013 204 532 A1 | 9/2014 | |
| DE | 10 2016 012 996 A1 | 5/2018 | |
| DE | 10 2016 224 181 A1 | 6/2018 | |
| DE | 10 2018 203 824 A1 | 9/2019 | |
| WO | WO 2017/137234 A1 | 8/2017 | |
| WO | WO-2018103936 A1 * | 6/2018 | B60L 58/12 |

OTHER PUBLICATIONS

German-language Written Opinion (PCT/ISA/237) issued in PCT Application No. PCT/EP2020/058539 dated Jun. 29, 2020 (three (3) pages).

German-language Search Report issued in German Application No. 10 2019 108 607.8 dated Jan. 9, 2020 with partial English translation (12 pages).

German-language Office Action issued in German Application No. 10 2019 108 607.8 dated Jan. 10, 2020 (six (6) pages).

German-language Office Action issued in German Application No. 10 2019 108 607.8 dated May 25, 2020 (three (3) pages).

Shen et al., "Charging Algorithms of Lithium-Ion Batteries: an Overview," Proceedings of the 2012 7th IEEE Conference on Industrial Electronics and Applications, ICIEA, pp. 1567-1572 (six (6) pages).

Chinese-language Office Action issued in Chinese Application No. 202080019571.3 dated Jun. 2, 2023 with English translation (16 pages).

* cited by examiner

SYSTEM AND METHOD FOR DETERMINING CHARGING PROFILES

BACKGROUND AND SUMMARY OF THE INVENTION

The disclosure relates to systems and methods for determining charging profiles for charging electrical energy storage units. The disclosure relates in particular to systems and methods for determining one or more charging profiles for charging an electrical energy storage unit in a motor vehicle.

The prior art discloses electrical energy storage units, in particular for electrically operated motor vehicles. The energy storage units are usually discharged or charged in a plurality of operating situations or states of charge. Charging may take place for example during operation through recovery or statically (that is to say outside of operation) at charging stations provided for this purpose. In static charging situations, fast charging of the energy storage unit is preferably desirable in order to reduce a downtime of the vehicle. As an alternative or in addition, provision may be made to minimize wear or ageing of the energy storage unit in connection with the charging process.

One known problem when charging electrical energy storage units that are based on lithium-ion technology is what is known as lithium plating (also Li-plating). This occurs in particular at relatively high charging currents and/or at low temperatures and may reduce a power of the energy storage unit, accelerate the ageing thereof and/or lead to failure of the energy storage unit. Further problems that concern the charging, in particular fast charging, of an energy storage unit are also known. By way of example, the selection of a charging profile that is unsuitable in terms of individual boundary conditions (for example temperature, state of charge, state of health, usage history) may already lead, within a charging process, to damage to the energy storage unit, this entailing one or more of the effects mentioned below: premature ageing of the energy storage unit, reduction in the capacity of the energy storage unit, susceptibility of the energy storage unit to particular wear or ageing processes.

Known methods for the (fast) charging of energy storage units are typically based on constant current (CC), constant voltage (CV) or multistage current charging (MSCC) algorithms. Shen, Weixiang & Vo, Thanh & Kapoor, Ajay (2012): "Charging algorithms of lithium-ion batteries: An overview", Proceedings of the 2012 7th IEEE Conference on Industrial Electronics and Applications, ICIEA 2012, 1567-1572, 10.1109/ICIEA.2012.6360973 describes for example various charging algorithms for Li-ion batteries.

Document US 2014/0266068 describes devices and methods that are intended to accelerate the charging process of a Li-ion battery based on a pulse charging algorithm. In this case, a battery is subjected to a plurality of charging pulses of 1 C or greater in order to allow charging that is as fast as possible.

In known methods, changing boundary conditions are often not taken into consideration in the selection of charging profiles. The selection of charging profiles is additionally usually complex and/or nontransparent. The charging time is furthermore usually not able to be optimized, in particular under a plurality of boundary conditions.

There is therefore a need for methods and systems that provide a transparent and/or simple selection of different charging profiles, with the different charging profiles taking into consideration a plurality of boundary conditions.

There is furthermore in particular a need for methods and systems that optimize, in particular shorten, a charging time of the energy storage unit taking into consideration a plurality of boundary conditions.

There is furthermore in particular a need for methods and systems that optimize a state, in particular wear or aging, of the energy storage unit taking into consideration a plurality of boundary conditions. The intention here is to increase or improve durability of the energy storage unit and/or to minimize the wear or the ageing thereof. This may in particular allow an increased service life of the energy storage unit.

There is furthermore in particular a need for methods and systems that allow an improved or optimized degree of utilization of the power of individual components (for example cells) of the energy storage unit. This may allow in particular an improved or optimized power of the energy storage unit and/or improved or optimized durability.

One object of the present disclosure is to provide systems and methods for charging electrical energy storage units that avoid one or more of the described disadvantages and/or allow one or more of the described advantages.

This object is achieved by the subject matter of the claimed invention.

In a first aspect according to some embodiments of the present disclosure, what is specified is a method for determining a charging profile from a plurality of charging profiles for a current charging process for charging an electrical energy storage unit. The method comprises determining a current state of the energy storage unit; determining the charging profile from the plurality of charging profiles based on the current state of the energy storage unit; and charging the energy storage unit based on the determined charging profile.

In a second aspect according to aspect 1, each charging profile of the plurality of charging profiles comprises at least a first profile of a charging current and a second profile of a charging current, wherein the first profile characterizes a lower charging power over time than the second profile.

In a third aspect according to aspect 2, each charging profile of the plurality of charging profiles furthermore comprises at least a third profile of a charging current, wherein the first profile and the second profile each characterize a lower charging power over time than the third profile.

In a fourth aspect according to one of aspects 1 to 3, the method furthermore comprises determining an application context that characterizes the current charging process, wherein the determination of the charging profile from the plurality of charging profiles is furthermore based on the application context. The determination of the application context is preferably repeated cyclically.

In a fifth aspect according to one of aspects 1 to 4, the method furthermore comprises determining a history that characterizes one or more previous charging processes of the energy storage unit; and wherein the determination of the charging profile from the plurality of charging profiles is furthermore based on the history.

In a sixth aspect according to one of aspects 1 to 5, the current state of the energy storage unit comprises at least a temperature of the energy storage unit, and the charging profile is determined from the plurality of charging profiles at least partially based on the temperature of the energy storage unit.

In a seventh aspect according to one of aspects 1 to 6, the current state of the energy storage unit comprises at least a current state of charge of the energy storage unit, and the charging profile is determined from the plurality of charging profiles at least partially based on the current state of charge of the energy storage unit.

In an eighth aspect according to aspect 7 in conjunction with aspect 2, the method furthermore comprises determining a second minimum cell temperature of the energy storage unit based on the current state of the energy storage unit and on the current state of charge of the energy storage unit; determining a current cell temperature of the energy storage unit (86) based on the current state of the energy storage unit; and selecting the second profile of the charging current for charging the energy storage unit based on the determined charging profile when the current cell temperature is greater than or equal to the second minimum cell temperature. The second minimum cell temperature is preferably determined based on a second matrix that assigns each of a plurality of minimum cell temperatures in each case to one of a plurality of states of charge of the energy storage unit.

In a ninth aspect according to aspect 7 in conjunction with aspect 3, the method furthermore comprises determining a third minimum cell temperature of the energy storage unit based on the current state of the energy storage unit and on the current state of charge of the energy storage unit; determining a current cell temperature of the energy storage unit based on the current state of the energy storage unit; and selecting the third profile of the charging current for charging the energy storage unit based on the determined charging profile when the current cell temperature is greater than or equal to the third minimum cell temperature. The third minimum cell temperature is preferably determined based on a third matrix that assigns each of a plurality of minimum cell temperatures in each case to one of a plurality of states of charge of the energy storage unit.

In a tenth aspect according to one of aspects 1 to 9, the method furthermore comprises providing the plurality of charging profiles.

In an eleventh aspect according to some embodiments of the present disclosure, what is specified is a system for determining a charging profile from a plurality of charging profiles for a current charging process for charging an electrical energy storage unit. The system comprises a control unit that is configured so as to execute methods according to some embodiments of the present disclosure, in particular according to one of preceding aspects 1 to 10.

In a twelfth aspect according to some embodiments of the present disclosure, what is specified is a vehicle. The vehicle comprises a system according to some embodiments of the present disclosure, in particular according to preceding aspect 11.

According to a further aspect, what is provided is a software program. The software program may be designed to be run on a processor and thereby to execute the method according to some embodiments of the present disclosure.

According to a further aspect, what is provided is a storage medium. The storage medium may comprise a software program that is designed to be run on a processor and thereby to execute the method according to some embodiments of the present disclosure.

The systems and methods disclosed here offer one or more of the advantages mentioned below.

Systems and methods according to the present disclosure for determining charging profiles for charging electrical energy storage units provide for example a transparent and/or simple selection of different charging profiles, resulting in particular in improved transparency and/or acceptance for a user.

Systems and methods according to the present disclosure for determining charging profiles for charging electrical energy storage units preferably take into consideration a plurality of boundary conditions, in particular by way of the different charging profiles. This makes it possible in particular for a charging time of the energy storage unit to be optimized, in particular shortened, taking into consideration a plurality of boundary conditions.

Systems and methods according to the present disclosure for determining charging profiles for charging electrical energy storage units furthermore make it possible to optimize a state, in particular wear or ageing, of the energy storage unit taking into consideration a plurality of boundary conditions. This may increase or improve in particular durability of the energy storage unit and/or minimize wear or ageing of the energy storage unit. This may furthermore increase or improve a service life of the energy storage unit.

Systems and methods according to the present disclosure for determining charging profiles for charging electrical energy storage units furthermore allow for example an improved or optimized degree of utilization of the power of individual components (for example cells) of the energy storage unit. This may in particular allow improved or optimized performance of the energy storage unit overall and/or improved or optimized durability thereof.

Exemplary embodiments of the disclosure are illustrated in the figures and are described in more detail below. In this case, unless indicated otherwise, the same reference signs are used below for identical and functionally identical elements.

DETAILED DESCRIPTION OF THE DRAWINGS

Unless indicated otherwise, the same reference signs are used below for identical and functionally identical elements.

Figure 1:
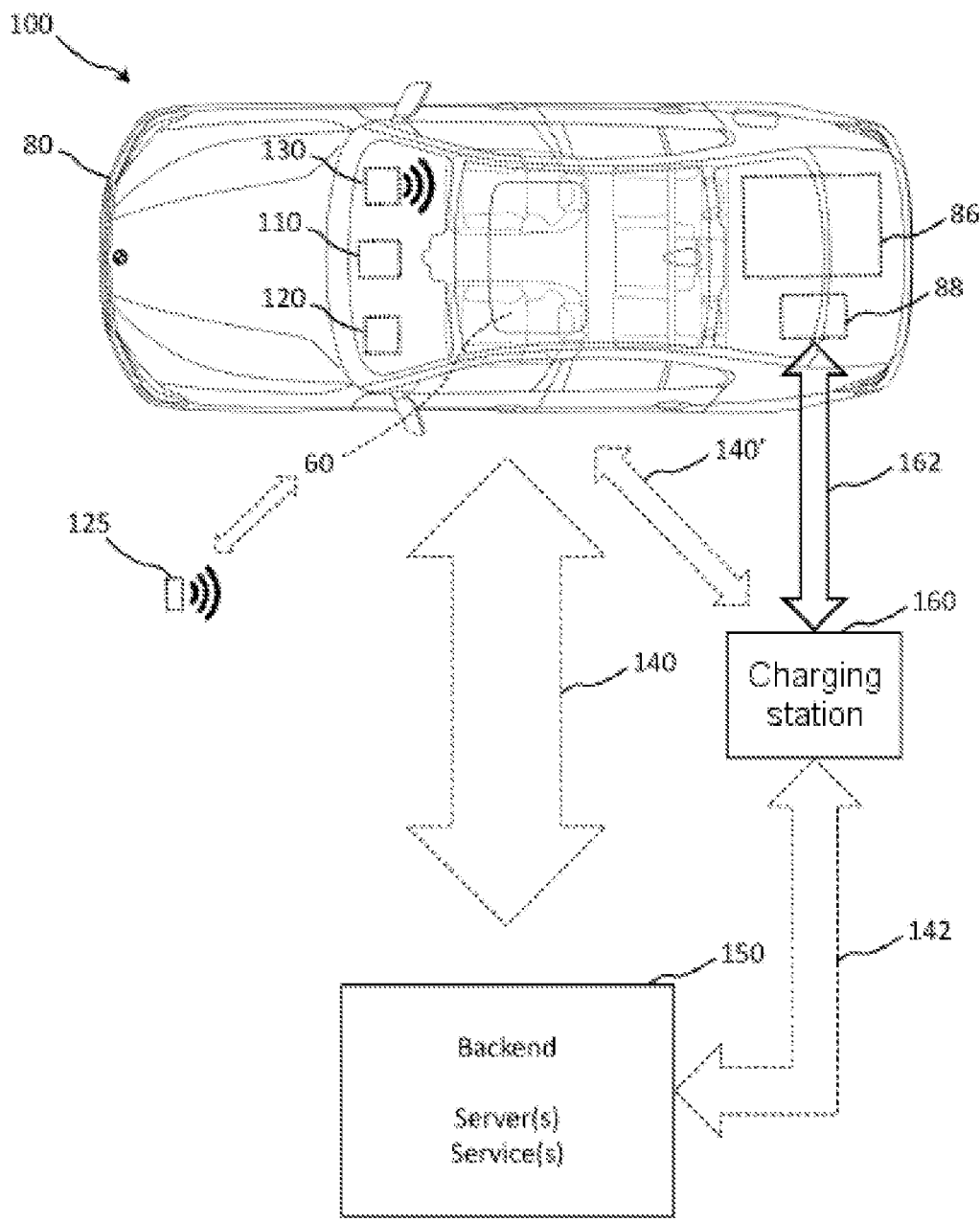
FIG. 1 schematically illustrates the structure of a system according to some embodiments of the present disclosure for determining charging profiles for charging electrical energy storage units.

FIG. 1 schematically illustrates the structure of a system 100 according to some embodiments of the present disclosure for determining charging profiles for charging electrical energy storage units 86.

The term "vehicle" comprises automobiles, trucks, buses, RVs, motorcycles, etc. that serve to transport people, goods, etc. The term in particular comprises motor vehicles for transporting passengers. Electrically driven vehicles 80 (in particular hybrid or electric vehicles) are driven by an electric motor and comprise one or more electrical energy storage units 86 (for example batteries, high-voltage storage units) that are able to be connected to a charging station 160 and charged by a charging device 88 of the vehicle 80. Various charging technologies may be used to charge the electrical storage units 86 of such hybrid or electric vehicles.

The system 100 may essentially be implemented on a controller 120 of the vehicle 80 and/or on one or more back-end components 150 (for example servers, services).

In addition to the controller 120, the vehicle 80 furthermore comprises a communication unit 130 that is configured for data communication 140 with components (for example backend 150) external to the vehicle 80, and a user interface 110 that may be implemented for example as a touchscreen in the vehicle 80 (for example on or in the dashboard region of the vehicle 80 or as part of a rear seat entertainment system in the back of the vehicle 80; not shown). The communication unit 130 may furthermore be configured so as to provide a data connection to mobile terminals 125, in particular to those that are located in the vehicle 80 and/or in the surroundings of the vehicle 80 and/or are used by the user 60. The system 100 may furthermore be implemented at least in part on a mobile terminal 125 of a user 60. In some embodiments, the mobile terminal 125 and/or a user interface 110' executed thereon is used to interact with the system 100. Parts of the system 100 may also optionally be implemented on the mobile terminal 125 (for example user surfaces).

The system 100 may be operated in part or in full via the user interface 110 in the vehicle 80 and/or via the user interface 110' of a mobile terminal 125 of a user. The user interface 110' may essentially provide the same functions as the user interface 110 and implement the same or essentially the same functions as described below with reference to the user interface 110 in the vehicle 80. The user interface 110' may furthermore implement all the necessary components that are described in relation to the user interface 110, for example voice input and output, cameras and screens, biometric sensors (for example fingerprint scanner, retina scanner) and the like.

The user interface 110 may comprise one or more multimode user interfaces, in particular user interfaces that are configured for the operation of the vehicle 80 (for example communication, infotainment, air-conditioning, seat adjustment, vehicle settings). The user interface 110 allows the multimode acquisition of inputs by a user 60, for example via a graphical user surface (for example touchscreen), via conventional operating elements of the vehicle 80 (for example buttons, switches, iDrive controller), through voice control (for example by way of a sensor system 210), through scanners (for example for fingerprints, retina) and the like. The user interface 110 furthermore allows the multimode output of information to a user 60, for example via a graphical display element (for example touchscreen, head-up display, instrument panel, central information display or CID), via tactile elements (for example vibration of the steering wheel or of parts of the seat), through voice output via a loudspeaker system present in the vehicle (for example infotainment system) or acoustic signal transmitters (for example gong, beeper) and the like. The user interfaces 110 may implement a graphical user interface based on corresponding configuration data and in which display elements and operating elements are displayed, these being able to be used by the user 60 to operate the vehicle 80. In addition or as an alternative, the user interface may contain (further) display and operating elements, for example switches, buttons and displays.

The controller 120 may enter into data communication 140 with (external) back-end components and services 150 via the communication unit 130 and thus for example communicate with back-end servers and/or services 150. As an alternative or in addition, the controller 120 may enter into data communication with the mobile terminal 125 of a user 60 via the communication unit 130 and use data and/or sensors that are provided by the mobile terminal 125 (as described above).

The system 100 may furthermore have one or more back-end components 150 or infrastructure external to the vehicle 80 and that provide one or more resources (for example server, services). The one or more back-end components 150 may be in data communication 140 temporarily or permanently with the controller 120 of the vehicle 80 and/or with the mobile terminal 125. Resource-intensive processing steps (for example processing natural speech and/or images or video data, voice recognition, processing of large external amounts of data) may preferably be delegated to the external back-end component 150; it would be difficult or even impossible for these resource-intensive processing steps to be performed by the controller 120 in the vehicle 80 and/or by the mobile terminal 125. Consideration may also be given here to any requirements in terms of computing power, memory capacity, available bandwidth, connection to external data sources and the like.

The vehicle 80 preferably has one or more electrical energy storage units 86 that are able to be connected to a charging station 160 via a charging device 88 of the vehicle 80 in order to charge the one or more electrical energy storage units 86. The controller 120 of the vehicle 80 may for this purpose enter directly into data communication 140' with the charging station 160, for example via the communication unit 130 and/or a wired connection 162. The energy storage unit 86 is typically charged via the wired connection 162, but this may alternatively also be performed in other ways (for example through induction). The controller 120 may, as an alternative or in addition, be in data communication 140 with one or more back-end components 150, for example for billing purposes, and/or communicate indirectly with the charging station 160 via one or more back-end components 150 (cf. connection 142 in FIG. 1).

Figures 1A, 1B:
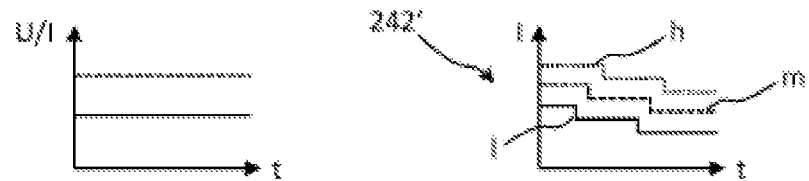
FIG. 1A illustrates a simplified exemplary profile of a charging voltage and of a charging current over the charging time.
FIG. 1B shows a simplified exemplary charging profile containing profiles of charging currents over the charging time.

The energy storage unit 86 may be charged based on a charging profile. Exemplary charging profiles involve charging with constant current and/or constant voltage (CC/CV) or with multistage charging current (MSCC). A charging profile preferably defines a profile of the charging current and/or a profile of the charging voltage over the charging time. FIG. 1A illustrates a simplified exemplary profile of a charging voltage and of a charging current over the charging time, these being substantially constant (CC/CV). As soon as the energy storage unit is almost fully charged, the charging current is usually reduced and drops toward zero (not illustrated).

Using conventional charging profiles without taking into consideration boundary conditions, as set forth at the outset, may entail multiple problems, for example longer charging times and/or higher wear or accelerated ageing of the energy storage unit.

According to some embodiments of the present disclosure, multiple boundary conditions are taken into consideration in order to determine a suitable charging profile, wherein a weighting may be performed between the individual boundary conditions. In this case, the charging profile is determined at least based on the minimum cell temperature and the current state of charge (SoC) of the energy storage unit:

minimum cell temperature ($T_{cell,minimum}$),
state of charge of the energy storage unit 86 (SoC)

wherein the permissibility of a high or medium charging current is preferably restricted.

The determination furthermore preferably takes place taking into consideration one or more of the following boundary conditions:
- range of the vehicle 80
- infrastructure limit
- thermal capacities of subcomponents of the high-voltage system (HVS)
- temperature spread(s)
- available HVS cooling power
- state of the energy storage unit (SoH or "state of health")
- usage history FIG. 1B shows a simplified exemplary charging profile 242' containing profiles h, m, l of charging currents I over a charging time t. The profiles h, m, l characterize charging currents that decrease in steps over the charging time, wherein the profile h characterizes a high (h="high") charging current, the profile m characterizes a medium (m="medium") charging current and the profile l characterizes a low (l="low") charging current. The charging profile 242' that is shown thus comprises various profiles h, m, 1 of charging currents that may be selected based on boundary conditions. According to some embodiments of the present disclosure, this makes it possible to determine a charging profile and to adjust to potentially changing boundary conditions. Provision is thus made for example to initially determine a charging profile 242, 242' from a plurality of charging profiles 242-1, 242-2, . . . , 242-n and a suitable profile l, m, h of the charging current and to select another profile of the charging current in the course of the charging process based on (potentially changing) boundary conditions. In this case, according to the present disclosure, provision is not made to change from a profile of a lower charging current (for example profile l, m) to a profile of a higher charging current (for example l to m or m to h). The lowest profile l of the charging current of a charging profile is essentially applicable. Provision is expressly made to change to the respective profile containing the next-lowest charging current (for example h to m or m to l) should the boundary conditions change accordingly.

Figure 2:
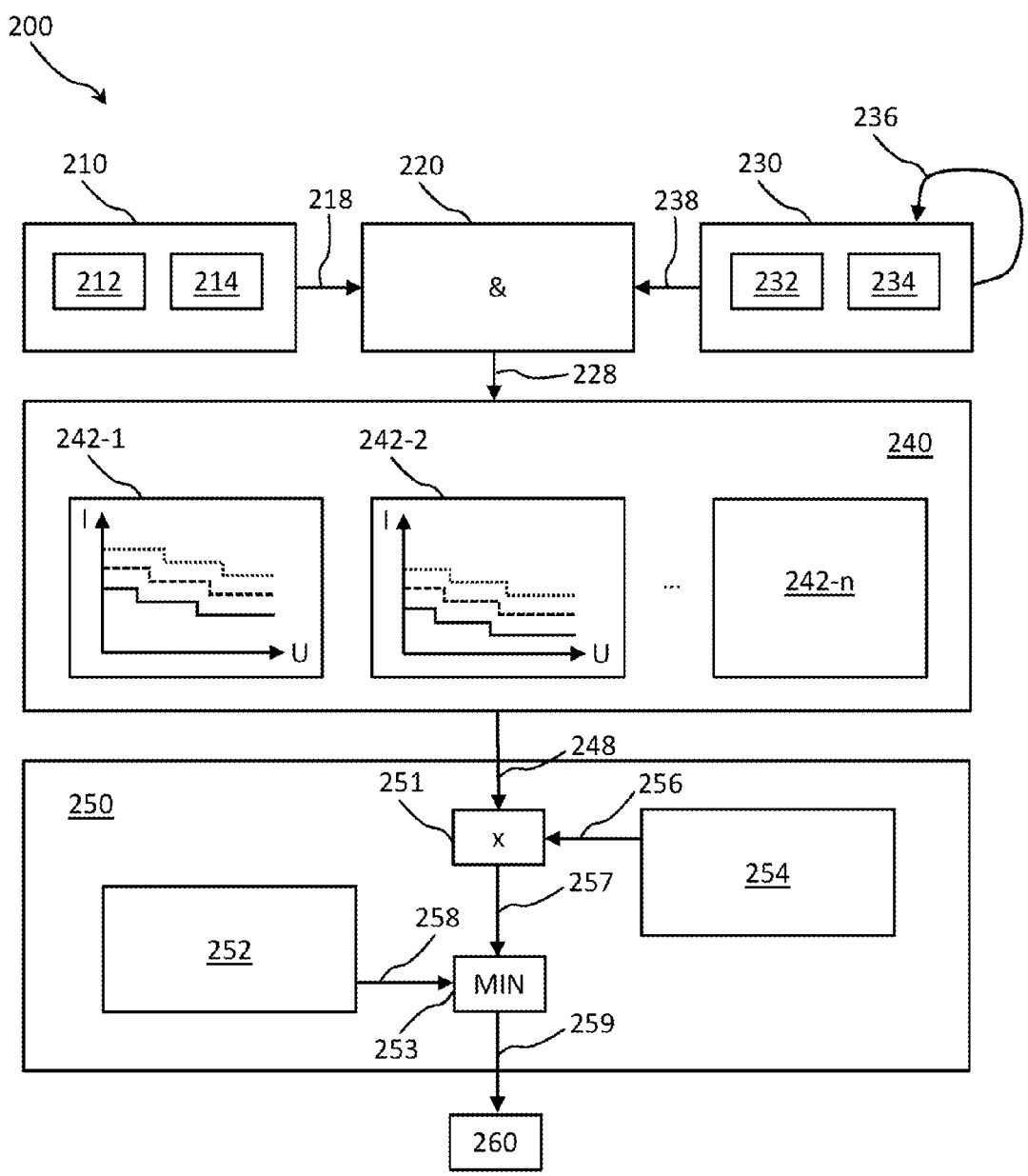
FIG. 2 schematically shows the exemplary structure of a model for determining charging profiles for charging electrical energy storage units according to some embodiments of the present disclosure.

FIG. 2 schematically shows the exemplary structure of a model for determining charging profiles for charging electrical energy storage units according to some embodiments of the present disclosure. In block 210, pre-controlled parameters are determined based on a history of charging processes. The history may for example comprise a number of charging processes that make it possible to conclude as to the usage of the energy storage unit. By way of example, it is possible to acquire a number of fast charging processes 212 (for example charging with DC current) and to restrict or prevent the possibility of further subsequent fast charging processes based thereon. This is based on the finding that repeated fast charging of the energy storage unit (for example for long journeys) may promote ageing or wear thereof. It is furthermore possible, based on the history, to identify whether a user 60 has for example performed multiple plug-in procedures 214 such that, following a charging process that was possibly interrupted or terminated early, subsequent charging processes may be performed on the basis of the parameters of the charging process. It is thus possible for example to prevent a charging power of a subsequent charging process being performed based on a higher charging current than a previous charging process, since this may likewise promote ageing or wear of the energy storage unit. The charging current is preferably limited successively more and more in subsequent fast charges (for example DC). In one example, the first fast charge is performed with 100% of the charging current, while further subsequent fast charges are reduced to 85%, to 75% and finally to 65%. The result of the determination of the pre-controlled parameters is forwarded 218 to a selection logic unit 220.

In block 230, predictively readjusted parameters are determined, for example relating to an application context 232 (for example user behavior, charging infrastructure) and/or relating to the state 234 of the HVS. The application context 232 may for example contain the fact that a desired range of the user 60 and/or a range specification of the navigation system of the vehicle 80 is taken into consideration. In the case of a desired range specified by the user 60 or a corresponding SoC desired by the user 60 that is below a complete charge of the energy storage unit (for example 50%), it is not necessary to perform (fast) charging up to an SoC that is considerably above the desired or required value. The same applies to the case of a remaining distance specified by the navigation system being (substantially) below a complete charge of the energy storage unit. In this case, possibly gentler charging to a sufficient SoC may allow advantages in terms of charging time and/or ageing or wear of the energy storage unit. The charging structure may in this case, in addition to a current state (for example essentially available power), also be subject to varying conditions, for example degradation or recovery. It may thus for example be the case that the charging infrastructure is not able to provide the full basic power because many charging processes are taking place in parallel at the same time. An available power may likewise rise or fall on the basis of a current degree of utilization.

The state 234 of the HVS may for example contain: SK thermal capacities, temperature spreads within or of individual cells and/or the HVS and a cooling power of the HVS. Fast charging processes load both the charging infrastructure and one or more HVS components, the power of which may therefore vary.

In preferred embodiments, a temperature spread is determined, this taking into consideration a temperature spread within one cell and/or between different cells. The smaller the spread turns out to be, the greater the charging current may be selected to be. In one example, a third profile h of the charging current may be selected when a spread of less than 3° C. is determined, a second profile m of the charging current may be selected when a spread of less than 7° C. is determined, and a first profile l of the charging current may be selected otherwise.

Predictively readjusted parameters are preferably determined cyclically 236, for example at intervals of 5 seconds, 30 seconds or 60 seconds. The result of the determination of the predictively readjusted parameters is likewise forwarded 238 to the selection logic unit 220.

The selection logic unit 220, based on the input parameters 218, 238, determines 228 a suitable charging profile 242-1, 242-2, . . . , 242-n from a plurality of starting temperature-dependent charging profiles 242-1, 242-2, . . . , 242-n, wherein each charging profile of the plurality of charging profiles 242-1, 242-2, . . . , 242-n has a specific starting temperature (for example from 25° C., from 15° C., etc.). The charging profiles or charging characteristic maps are combined in the model in block 240.

In block 250, the determined 248 charging profile 242-1, 242-2, . . . , 242-n (for example as function $I=f(U)$) is checked again in the sense of protective functions and possibly adjusted. In this case, a service life-based reduction 254 of the charging current is preferably made based on an acquired service life or an SoH of the energy storage unit 86, wherein the corresponding factor 256 (for example in the range from 0.65 to 1.00, corresponding to 65% to 100% of the input value) is applied to the charging profile with a corresponding operator 251. It is thus made possible for an energy storage unit with an already advanced service life or lower SoH to be charged with a lower charging current (for example 65% of the value or profile specified by the determined charging profile) than a newer energy storage unit with a correspondingly lower service life or higher SoH. The result 257 then contains a function I=f(SoH) that is furthermore compared 253 with a thermal current regulation 252. The thermal current regulation 252 provides a comparison function I=f(T) as result 258 (for example 0 ... x A), wherein, in the illustrated example, the minimum of the results 257 and 258 is determined 259 and output 260. The output 260 then contains the adjusted or checked charging profile.

Figure 3:
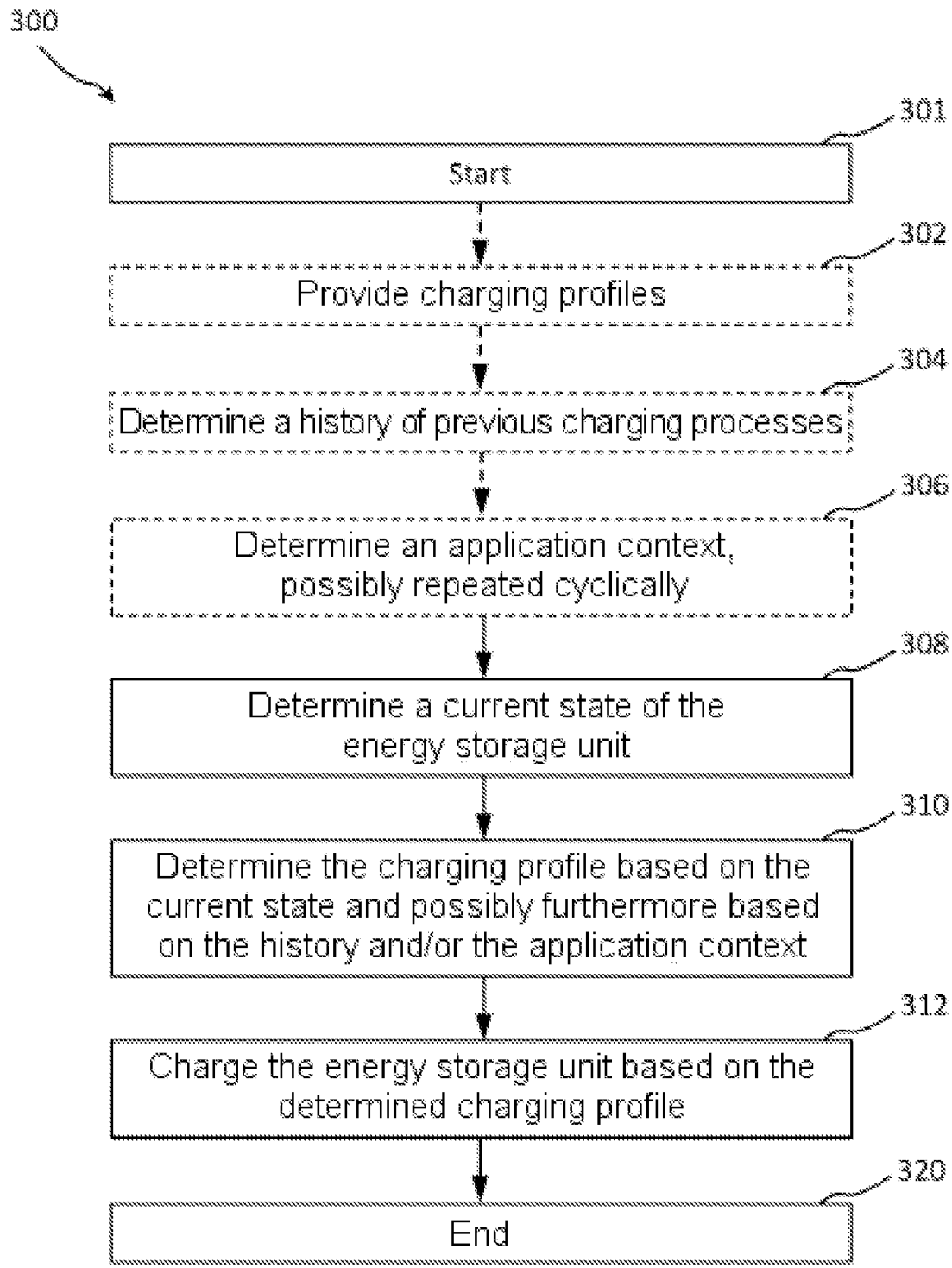
FIG. 3 shows a flowchart of a method for determining charging profiles for charging electrical energy storage units according to some embodiments of the present disclosure.

FIG. 3 shows a flowchart of a method 300 according to some embodiments of the present disclosure for determining a charging profile 242 from a plurality of charging profiles 242-1, 242-2, ..., 242-n for a current charging process for charging an electrical energy storage unit. The method 300 begins in step 301. Steps 302, 304 and 306 are preferably optional and may be performed in the desired order in any desired combination.

In step 308, a current state 234 of the energy storage unit 86 is determined. The state 234 of the HVS may in particular contain SK thermal capacities, temperature spreads within or of individual cells and/or the HVS and a cooling power of the HVS. The specific profile (for example l, m, h) of a charging profile 242 is preferably adjusted based on the cooling power of the HVS system, wherein the third profile h is selected at a high cooling power and the second profile m is selected at a medium cooling power. The first profile l may in principle always be selected, regardless of the cooling power of the HVS system. More preferably, the specific profile (for example l, m, h) of a charging profile 242 is selected based on a current temperature and/or a current SoC of the energy storage unit 86, wherein a high temperature in combination with a medium/high SoC (or a medium/high temperature in combination with a high SoC) lead to the selection of the first profile l. Combinations of a high temperature and low SoC, of a medium temperature and medium SoC and of a low temperature and high SoC lead to the selection of the second profile m. A low temperature in combination with a medium/low SoC (or a low/medium temperature in combination with a low SoC) leads to the selection of the third profile h. More preferably, the specific profile (for example l, m, h) of a charging profile 242 is selected based on an infrastructure power or degradation, wherein The third step 308 is preferably repeated cyclically, such that current temperatures (for example cell temperatures, component temperatures) and/or the current SoC are able to be determined cyclically. The specific profile (for example l, m, h) of the charging profile 242 may be selected based thereon (cf. step 308-4 or 308-5). In preferred embodiments, the cyclic determination takes place in intervals of up to 60 s (1 minute), more preferably 30 s, even more preferably up to 5 s.

In step 310, the charging profile 242 is determined from the plurality of charging profiles 242-1, 242-2, ..., 242-n based on the current state 234 of the energy storage unit 86.

In step 312, the energy storage unit 86 is charged based on the determined charging profile 242. In this case, one or more of the abovementioned boundary conditions may be taken into consideration (see above) and corresponding profiles (for example l, m, h) of the charging current may be selected.

In preferred embodiments, the state 234 in particular contains one or more temperatures (for example cell temperatures, component temperatures) of the energy storage unit. Based thereon and based on the current SoC of the energy storage unit 86, a second minimum cell temperature of the energy storage unit 86 is preferably determined (a first minimum temperature is essentially considered to be met). If the current cell temperature is greater than or equal to the second minimum cell temperature (for a respective SoC), then the second profile m of the charging current may be selected (see above).

More preferably, a third minimum cell temperature of the energy storage unit 86 may be determined based on the state 234 and based on the current SoC of the energy storage unit 86. If the current cell temperature is greater than or equal to the third minimum cell temperature (for a respective SoC), then the third profile h of the charging current may be selected (see above). An exemplary matrix for determining a profile h is specified in table 1 and an exemplary matrix for determining a profile m is specified in table 2.

TABLE 1

| T in ° C. | SoC in % |
|---|---|
| 30 | 0 |
| 36 | 25 |
| 40 | 50 |
| 39 | 60 |
| 35 | 80 |

TABLE 2

| T in ° C. | SoC in % |
|---|---|
| 27 | 0 |
| 32 | 25 |
| 33 | 50 |
| 33 | 60 |
| 31 | 80 |

Although the invention has been described and illustrated in more detail through preferred exemplary embodiments, the invention is not restricted to the disclosed examples and other variations may be derived therefrom by a person skilled in the art without departing from the scope of protection of the invention. It is therefore clear that there are a plurality of variation possibilities. It is likewise clear that embodiments cited by way of example actually only constitute examples that should not be understood in any way as limiting for instance the scope of protection, the application possibilities or the configuration of the invention. On the contrary, the above description and the description of the figures give a person skilled in the art the ability to implement the exemplary embodiments in specific terms, wherein a person skilled in the art, with knowledge of the disclosed concept of the invention, may make a wide variety of modifications, for example with regard to the function or the arrangement of individual elements mentioned in one exemplary embodiment, without departing from the scope of protection that is defined by the claims and their legal counterparts, such as for instance further explanations in the description.

What is claimed is:

1. A method for determining a charging profile from a plurality of charging profiles for a current charging process for charging an electrical energy storage unit, the method comprising:
   determining a current state of the energy storage unit;
   determining an application context that characterizes the current charging process;
   determining the charging profile from the plurality of charging profiles based on the current state of the energy storage unit and based on the application context; and
   charging the energy storage unit based on the determined charging profile,
   wherein the current state of the energy storage unit comprises a current temperature spread within one cell or between different cells of the energy storage unit, and the charging profile is determined from the plurality of charging profiles at least partially based on the current temperature spread.

2. The method according to claim 1, wherein each charging profile of the plurality of charging profiles comprises at least a first profile of a first charging current and a second profile of a second charging current, and the first profile characterizes a lower charging power over time than the second profile.

3. The method according to claim 2, wherein each charging profile of the plurality of charging profiles further comprises at least a third profile of a third charging current, wherein the first profile and the second profile each characterize a lower charging power over time than the third profile.

4. The method according to claim 1, wherein determining the application context is repeated cyclically.

5. The method according to claim 1, further comprising determining a history that characterizes one or more previous charging processes of the energy storage unit, wherein determining the charging profile from the plurality of charging profiles is further based on the history.

6. The method according to claim 1, wherein the current state of the energy storage unit comprises at least a temperature of the energy storage unit, and the charging profile is determined from the plurality of charging profiles at least partially based on the temperature of the energy storage unit.

7. The method according to claim 1, wherein the current state of the energy storage unit comprises at least a current state of charge of the energy storage unit, and the charging profile is determined from the plurality of charging profiles at least partially based on the current state of charge of the energy storage unit.

8. The method according to claim 7, wherein each charging profile of the plurality of charging profiles comprises at least a first profile of a first charging current and a second profile of a second charging current, and the first profile characterizes a lower charging power over time than the second profile, the method further comprising:
   determining a second minimum cell temperature of the energy storage unit based on the current state of the energy storage unit;
   determining a current cell temperature of the energy storage unit based on the current state of the energy storage unit; and
   selecting the second profile of the second charging current for charging the energy storage unit based on the determined charging profile when the current cell temperature is greater than or equal to the second minimum cell temperature.

9. The method according to claim 8, wherein the second minimum cell temperature is determined based on a second matrix that assigns each of a plurality of minimum cell temperatures to one of a plurality of states of charge of the energy storage unit.

10. The method according to claim 7, wherein each charging profile of the plurality of charging profiles further comprises at least a third profile of a third charging current, wherein the first profile and the second profile each characterize a lower charging power over time than the third profile, the method further comprising:
    determining a third minimum cell temperature of the energy storage unit based on the current state of the energy storage unit;
    determining a current cell temperature of the energy storage unit based on the current state of the energy storage unit; and
    selecting the third profile of the charging current for charging the energy storage unit based on the determined charging profile when the current cell temperature is greater than or equal to the third minimum cell temperature.

11. The method according to claim 10, wherein the third minimum cell temperature is determined based on a third matrix that assigns each of a plurality of minimum cell temperatures to one of a plurality of states of charge of the energy storage unit.

12. The method according to claim 1, further comprising providing the plurality of charging profiles.

13. A system for determining a charging profile from a plurality of charging profiles for a current charging process for charging an electrical energy storage unit, the system comprising:
    a control unit,
    wherein the control unit is configured to execute the method according to claim 1.

14. A vehicle comprising the system according to claim 13.

* * * * *